US008922886B2

(12) United States Patent
Mizuta

(10) Patent No.: US 8,922,886 B2
(45) Date of Patent: Dec. 30, 2014

(54) MICROSCOPE APPARATUS HAVING SURFACE LIGHT EMITTER WITH SPECIFIC POSITIONING

(75) Inventor: Masahiro Mizuta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/340,296

(22) Filed: Dec. 29, 2011

(65) Prior Publication Data

US 2012/0127569 A1 May 24, 2012

Related U.S. Application Data

(63) Continuation of application No. PCT/JP2010/060706, filed on Jun. 24, 2010.

(30) Foreign Application Priority Data

Jul. 6, 2009 (JP) .................................. 2009-159483

(51) Int. Cl.
*G02B 21/06* (2006.01)
*G02B 21/08* (2006.01)

(52) U.S. Cl.
CPC .................................. *G02B 21/086* (2013.01)
USPC ......................................................... 359/385

(58) Field of Classification Search
USPC ......... 359/379, 382, 383, 432, 385, 368, 380, 359/599
See application file for complete search history.

(56) References Cited

U.S. PATENT DOCUMENTS

| 6,040,940 | A * | 3/2000 | Kawasaki ..................... 359/389 |
| 6,396,628 | B1 | 5/2002 | Osa et al. |
| 6,643,061 | B2 | 11/2003 | Osa et al. |
| 6,992,718 | B1 * | 1/2006 | Takahara ................. 348/333.09 |
| 7,345,815 | B2 * | 3/2008 | Shimizu et al. ............... 359/385 |
| 2003/0132507 | A1 * | 7/2003 | Odaira .......................... 257/620 |
| 2010/0309548 | A1 * | 12/2010 | Power et al. .................. 359/385 |

FOREIGN PATENT DOCUMENTS

| CN | 101256277 A | 9/2008 |
| JP | 3-223710 | 10/1991 |
| JP | 3-293311 | 12/1991 |

(Continued)

OTHER PUBLICATIONS

International Search Report for PCT/JP2010/060706, mailed Sep. 21, 2010.
Japanese Patent Office Notice of Reasons for Rejection dated Apr. 23, 2013 for corresponding Japanese Patent Application No. 2011-521880.

(Continued)

*Primary Examiner* — Frank Font
*Assistant Examiner* — Tamara Y Washington
(74) *Attorney, Agent, or Firm* — Staas & Halsey LLP

(57) ABSTRACT

A microscope apparatus including an illumination apparatus capable of, regardless of the observation magnification of an imaging optical system, filling the entrance pupil of the imaging optical system with illumination light, and suitably restricting the conjugate image of the entrance pupil of the imaging optical system by a light shielding element. A microscope apparatus is configured by including: an illumination apparatus which includes a surface light emitter (light guide plate) having a light emitting surface as a planar light-emitting region and irradiates a sample with light emitted from the light guide plate; an objective lens which condenses light from the sample; and an imaging optical system which includes a variable power lens group configured to form an image of the sample by changing the magnification of the image of the sample. The illumination apparatus includes a light shielding plate and a light diffusing element.

11 Claims, 10 Drawing Sheets

(56) References Cited

FOREIGN PATENT DOCUMENTS

| | | |
|---|---|---|
| JP | 4-95914 | 3/1992 |
| JP | 11-133308 | 5/1999 |
| JP | 2002-189174 | 7/2002 |
| JP | 2005-31360 | 2/2005 |
| JP | 2005-181428 | 7/2005 |
| JP | 2007-147743 | 6/2007 |
| JP | 2007-333800 | 12/2007 |

OTHER PUBLICATIONS

International Preliminary Report on Patentability, Form PCT/IB/373, issued Feb. 14, 2012, and Written Opinion, Form PCT/ISA/237, mailed Sep. 21, 2010, in corresponding PCT Application No. PCT/JP2010/060706.
Chinese Office Action issued Jul. 1, 2013 in corresponding Chinese Patent Application No. 201080030240.6.
Chinese Office Action issued Feb. 17, 2014 in corresponding Chinese Patent Application No. 201080030240.6.

* cited by examiner

Fig.5
(a) 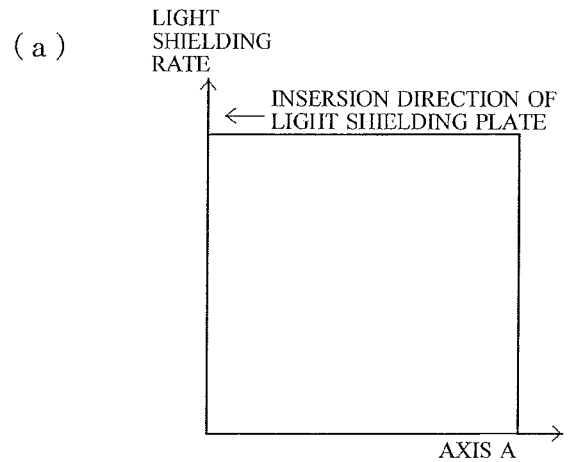
(b) 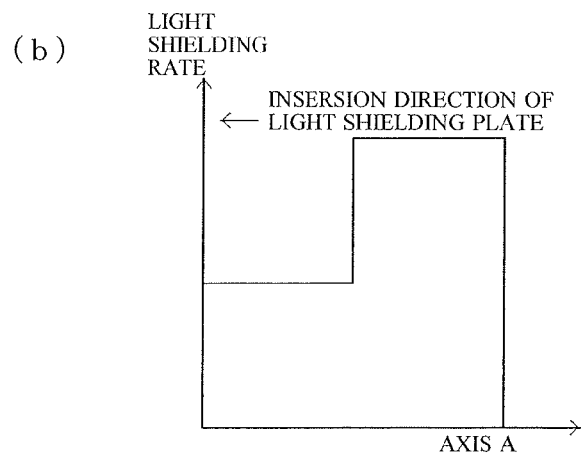
(c) 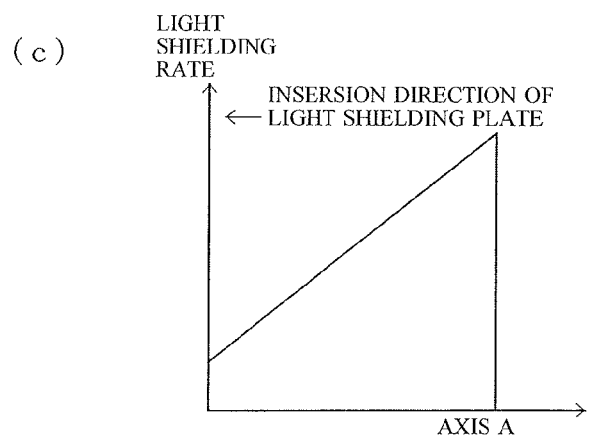

Fig.9
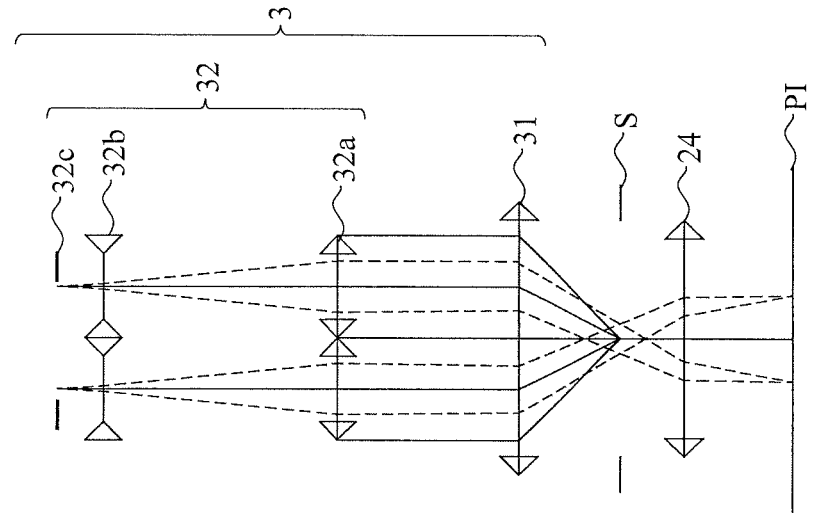
(a) LOW MAGNIFICATION
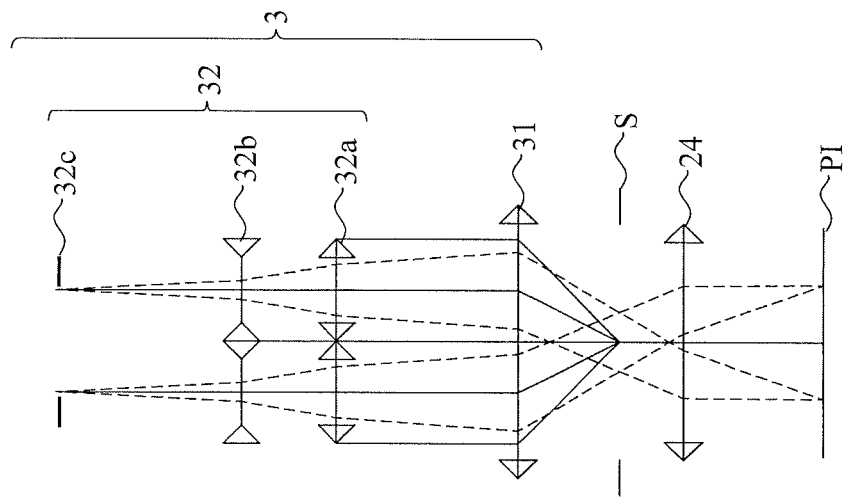
(b) HIGH MAGNIFICATION

_US 8,922,886 B2_

MICROSCOPE APPARATUS HAVING SURFACE LIGHT EMITTER WITH SPECIFIC POSITIONING

This application is a continuation application of, and hereby claims priority, to International Application No. PCT/JP2010/060706 filed on Jun. 24, 2010, and claims priority to Japanese Application No. 2009-159483 filed on Jul. 6, 2009, the contents of which are hereby incorporated by reference in their entireties.

TECHNICAL FIELD

The present invention relates to a microscope apparatus.

BACKGROUND ART

In a conventional microscope apparatus, Koehler illumination is adopted, and a light source image is formed near the pupil conjugate position of the objective lens by using a light source, such as a halogen lamp and the like, a collector lens, a deflection mirror, and a projection lens (see, for example, Patent Literature 1). Further, it is proposed that a light shielding element is arranged near the pupil conjugate position of the objective lens to enable switching between bright-field illumination and dark-field illumination.

CITATION LIST

Patent Literature

[Patent Literature 1]
Japanese Patent Laid-Open No. 11-133308

SUMMARY OF INVENTION

Technical Problem

However, in the case of the conventional microscope apparatus, when it is provided with a variable power lens group which moves the pupil position of the imaging optical system in correspondence with observation magnification, there is a problem that the pupil conjugate image of the imaging optical system, which pupil conjugate image is moved in the optical axis direction by the change in the magnification, cannot be suitably restricted by the light shielding element which is moved in one plane having the optical axis of the objective lens as a normal, and hence the variable power range, in which oblique illumination can be performed, is restricted.

The present invention has been made in view of the above described circumstances. An object of the present invention is to provide a microscope apparatus having an illumination apparatus in which, regardless of the observation magnification of the imaging optical system, the entrance pupil of the imaging optical system can be filled with illumination light, and the pupil conjugate image can be suitably restricted by the light shielding element.

Solution to Problem

In order to solve the above described problem, a microscope apparatus according to the present invention is configured by including: an illumination apparatus which includes a surface light emitter having a light emitting surface as a planar light-emitting region and irradiates a sample with light emitted from the surface light emitter; and an imaging optical system which includes an objective lens configured to condense light from the sample, and a variable power lens group configured to form an image of the sample by changing the magnification of the image, and moves the position of the entrance pupil of the imaging optical system according to the change in the magnification. Further, the illumination apparatus includes a light diffusing element which is arranged on the sample side of the light emitting surface of the surface light emitter and diffuses the light emitted from the light emitting surface, and wherein the surface light emitter is arranged in a common region of the entrance pupil image which is formed via the light diffusing element according to the change in the magnification.

In the microscope apparatus, it is preferred that the illumination apparatus is configured to be able to perform oblique illumination.

Further, in the microscope apparatus, it is preferred that the illumination apparatus further includes a light shielding element which is arranged at a position between the surface light emitter and the light diffusing element, the position being closer to the surface light emitter than the light diffusing element, and shields a part of a luminous flux emitted from the light emitting surface, and wherein the light shielding element is arranged in a common region of a plurality of entrance pupil images formed via the light diffusing element according to the change in the magnification.

Further, in the microscope apparatus, when the distance between the light shielding element and the light diffusing element is set as D [mm], it is preferred that the condition given by the following expression is satisfied.

D≤34

Further, in the microscope apparatus, when the parallel light transmittance and the haze value which are optical properties of the diffusion surface formed in the light diffusing element are respectively set as T [%] and H [%], it is preferred that the conditions given by the following expressions are satisfied.

50<T<95

10<H<98

Further, in the microscope apparatus, it is preferred that the illumination apparatus includes a condenser lens which condenses the light emitted from the surface light emitter and irradiates the sample with the condensed light.

At this time, it is preferred that the condenser lens includes at least one surface formed in an aspheric shape.

Alternatively, it is preferred that the condenser lens is configured by a lens array in which a plurality of lenses arranged in an array form.

Further, in the microscope apparatus, it is preferred that the surface light emitter is configured by including a light source, and a light guide plate having a light emitting surface and allowing light emitted from the light source to be emitted from the light emitting surface.

At this time, it is preferred that the light source is configured by a plurality of white LEDs.

Alternatively, it is preferred that the light source is configured by a plurality of LEDs, each having a different peak wavelength.

Further, in the microscope apparatus, it is preferred that at least one of the surface light emitter and the condenser lens is configured to be movable along the optical axis.

Advantageous Effect(s) of Invention

When the microscope apparatus according to the present invention is configured as described above, it is possible that, regardless of the observation magnification of the imaging optical system, the entrance pupil of the imaging optical system is filled with the illumination light from the illumination apparatus, and that the oblique illumination is performed while the pupil conjugate image is suitably restricted by the light shielding element.

BRIEF DESCRIPTION OF DRAWINGS

FIG. 4 is an illustration showing a relationship between the conjugate image of the entrance pupil of an imaging optical system, and a light shielding plate, in which FIG. 4(a) shows the case where a light shielding plate having a rectangular shape is used, FIG. 4(b) shows the case where a light shielding plate having a circular aperture is used, and FIG. 4(c) shows the case where a light shielding plate having a slit aperture is used.

FIG. 5 is a graph showing a relationship between the insertion direction of the light shielding plate and the light shielding rate, in which FIG. 5(a) shows the case where a light shielding plate having a uniform light shielding rate is used, FIG. 5(b) shows the case where a light shielding plate having a two stage light shielding rate is used, and FIG. 5(c) shows the case where a light shielding plate having a continuously variable light shielding rate is used.

FIG. 6 is an illustration for explaining the position of the conjugate image of the entrance pupil of the imaging optical system, in which FIG. 6(a) shows the case where the variable power lens group is set to provide low magnification, and FIG. 6(b) shows the case where the variable power lens group is set to provide high magnification.

FIG. 9 is an illustration for explaining the position of the pupil conjugate image formed when the condenser lens is provided in the illumination apparatus, in which FIG. 9(a) shows the case where the variable power lens group is set to provide low magnification, and FIG. 6(b) shows the case where the variable power lens group is set to provide high magnification.

DESCRIPTION OF EMBODIMENTS

Figure 1:
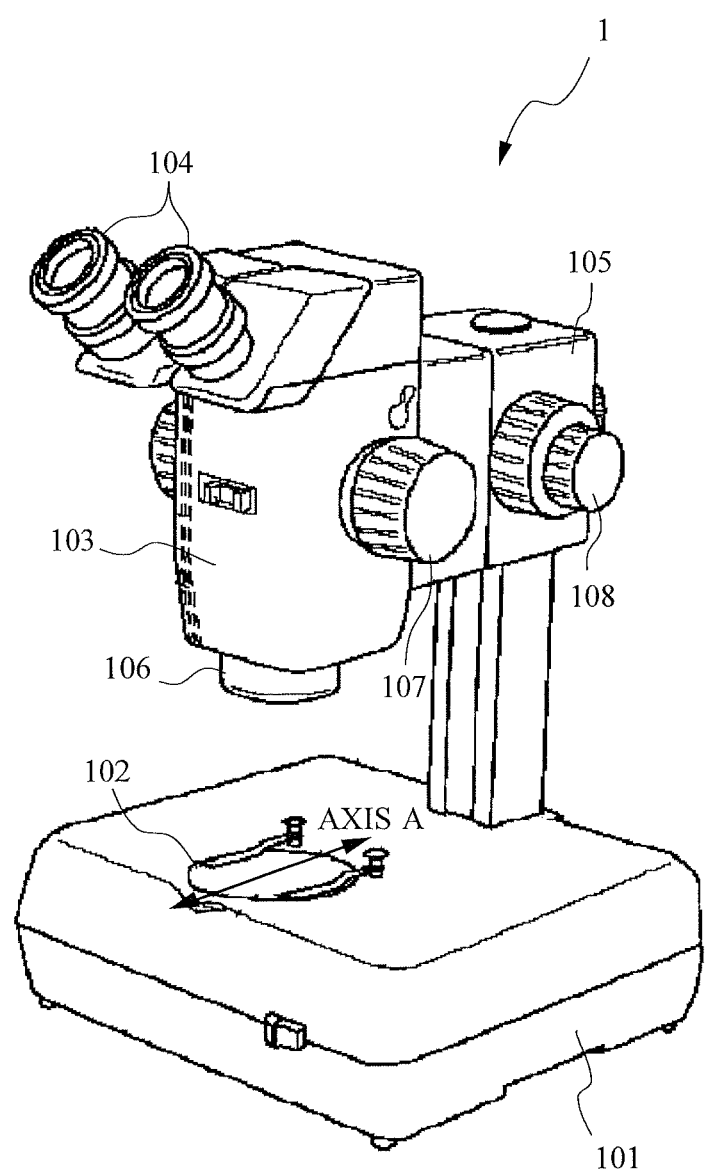
FIG. 1 is a perspective view showing an appearance of a microscope apparatus.
Figure 2:
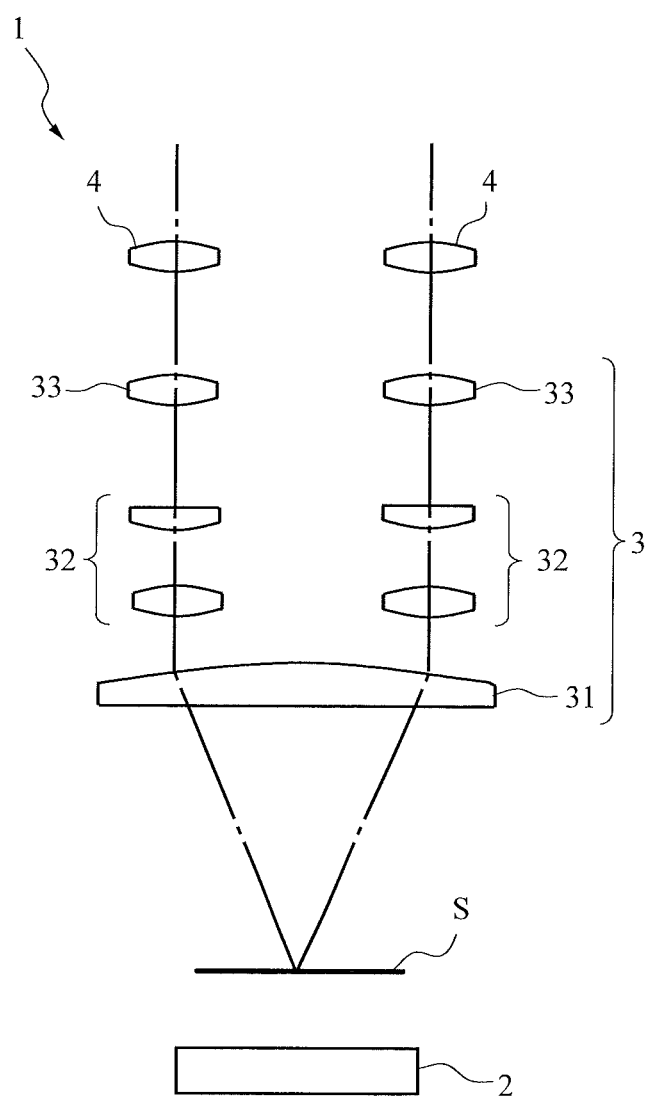
FIG. 2 is an illustration showing a configuration of the optical system of the microscope apparatus.

In the following, preferred embodiments according to the present invention will be described with reference to the accompanying drawings. First, a configuration of a parallel stereoscopic microscope apparatus having a variable power mechanism will be described with reference to FIG. 1 and FIG. 2. FIG. 1 and FIG. 2 show a single-objective binocular stereoscopic microscope apparatus (hereinafter referred to as "microscope apparatus 1") which is an example of the stereoscopic microscope apparatus. The optical system of the microscope apparatus 1 includes an imaging optical system 3 which forms a primary image of a sample (sample surface S) by condensing light illuminated by an illumination apparatus 2 and transmitted through the sample (sample surface S), and eyepieces 4 each of which enables the primary image formed by the imaging optical system 3 to be magnified and observed. Further, the imaging optical system 3 is configured by including an objective lens 31 which condenses a luminous flux transmitted through the sample surface S and converts the luminous flux into a parallel luminous flux, variable power lens groups 32 each of which condenses the parallel luminous flux emitted from the objective lens 31 and changes the observation magnification (changes the magnification) of the image of the sample, and imaging lenses 33 each of which forms the primary image of the sample.

The microscope apparatus 1 includes: a base unit 101 in which the illumination apparatus 2 is incorporated; a variable power lens barrel 103 to which the objective lens 31 and the eyepieces 4 are attached and in which the variable power lens groups 32 and the imaging lenses 33 are incorporated; and a focusing apparatus 105. Further, a sample platform 102 with a transparent member embedded therein is provided on the upper surface of the base unit 101, and the illumination apparatus 2 irradiates a sample placed on the sample platform 102 with illumination light from below the sample. Note that the objective lens 31 is attached to an objective lens attachment unit 106 provided at a lower portion of the variable power lens barrel 103. There are cases where the objective lens attachment unit 106 is configured such that one objective lens can be selected from a plurality of predetermined low power objective lenses and a plurality of predetermined high power objective lenses, so as to be attached to the objective lens attachment unit 106, and where the objective lens attachment unit 106 is configured such that a plurality of objective lenses can be selected from a plurality of predetermined low power objective lenses and a plurality of predetermined high power objective lenses, so as to be attached to the objective lens attachment unit 106. Further, each of the eyepieces 4 is housed in an eyepiece barrel 104, and is attached to an upper portion of the variable power lens barrel 103.

In the inside of the variable power lens barrel 103, the variable power lens group 32 and the imaging lens 33 for each of the left and right eyes are arranged. A variable power knob 107 is arranged at the outer side of the variable power lens barrel 103. A movable group for changing the magnification is included in the variable power lens group 32, and is moved in the optical axis direction by a predetermined movement amount corresponding to the rotation of the variable power knob 107. Further, an adjustable diaphragm (aperture stop) is included in the variable power lens group 32, and an adjustment mechanism of the adjustable diaphragm is provided in the variable power lens barrel 103. Further, the focusing apparatus 105 includes a focusing knob 108, and a mechanism unit (not shown) which moves the variable power lens barrel 103 vertically along the axis of the variable power lens barrel 103 according to the rotation of the focusing knob 108.

Figure 3:
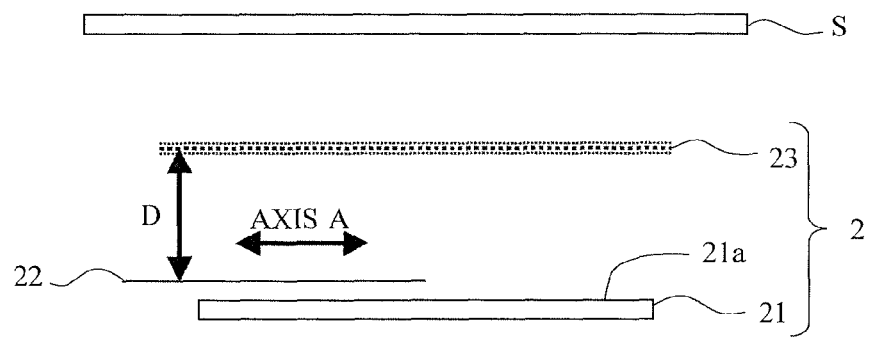
FIG. 3 is an illustration showing a configuration of an illumination apparatus.

As shown in FIG. 3, the illumination apparatus 2 incorporated in the base unit 101 is configured by arranging in order: a light guide plate 21, as a surface light emitter, which uses, as a light source, a plurality of white LEDs or a plurality of LEDs each having a peak at a different wavelength, and which has a light emitting surface 21a as a planar light emitting region; a light shielding plate 22, as a light shielding element, which shields a part of a luminous flux emitted from the light emitting surface of the light guide plate 21; and a light diffusing element 23 having a diffusion surface which diffuses the luminous flux transmitted without being shielded by the light shielding plate 22. Here, the light guide plate 21 performs surface light emission by using various light sources, such as a point light source, such as an LED and the like, or a line light source, such as a cold cathode tube and the like. For example, the light guide plate 21 is configured such that a light source is arranged at an end surface of an acrylic plate having a certain structure, so as to make the light from the light source incident on the end surface, and such that the incident light is repeatedly reflected in the acrylic plate so that the uniform light with the total reflection angle or less is emitted from the surface (light emitting surface 21a) of the light guide plate 21. The light guide plate 21 having such structure can be made very thin, and can perform uniform and very bright surface light emission.

When a type of white LEDs, which is most widely used at the present time and which is formed by combining a blue LED with a yellow phosphor, is used as a light source of the light guide plate 21, green and red components become insufficient so that the color rendering properties are degraded. On the other hand, when a multi-chip type LED configured by combining three kinds of LEDs for RGB is used, or when a plurality of one-chip type LEDs, each having a peak at a different wavelength, are used, illumination with adjustable chromaticity can be realized in such a manner that a drive circuit for changing the emission intensity of each of the color LEDs is provided so as to be adjusted by the observer itself. Further, in recent years, even in LEDs of one-chip type, an LED formed by combining a near-ultraviolet LED and a RGB phosphor and having excellent color rendering properties, has been invented, and hence such one-chip type LED can also be used as a light source of the light guide plate 21.

In the case of the conventional microscope apparatus, a deflection mirror for bending the optical axis must be used to reduce the size of the apparatus, and hence it is difficult that the thickness of the illumination apparatus is reduced to the thickness or less of the deflection mirror. When the thickness of the illumination apparatus is increased, the observation position is raised, and thereby the usability of the microscope apparatus is reduced. However, in the illumination apparatus 2 of the microscope apparatus 1 according to the present embodiment, the light guide plate 21 is used as a surface light emitter, and thereby the thickness of the illumination apparatus 2 can be reduced.

Figure 4:
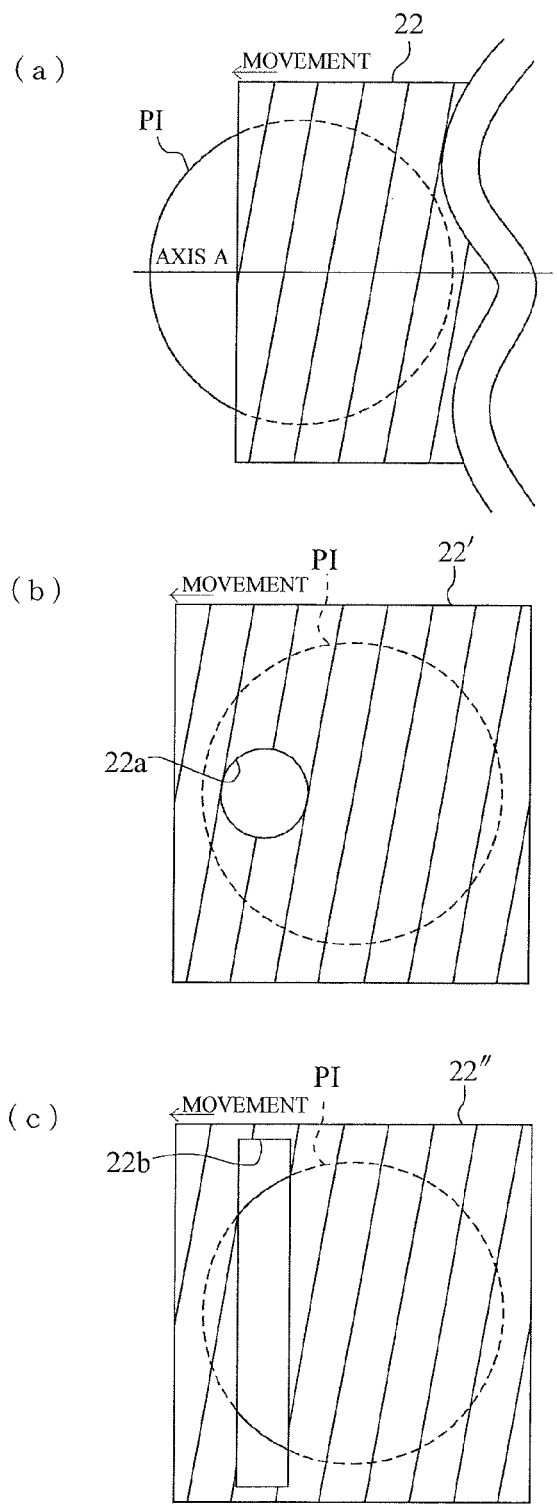

In order to observe a phase object by using the microscope apparatus 1, it is necessary to perform oblique illumination in such a manner that the pupil conjugate image of the imaging optical system 3 is restricted by the aperture shape of the light shielding plate 22. FIG. 4(a) shows a relationship between a pupil conjugate image PI seen from the side of the sample surface S and the rectangular light shielding plate 22 in the case where the pupil conjugate image PI is restricted by inserting the light shielding plate 22 from one side into the optical path along the axis A shown in FIG. 1 and FIG. 3. The normal vector of the light shielding plate 22 is in parallel with the optical axis, and hence it is possible to obliquely illuminate the sample surface S by moving the light shielding plate 22 in the plane substantially vertical to the optical axis. Note that the shape of the light shielding plate 22 is not limited to the rectangular shape. As shown in FIG. 4(b), a light shielding plate 22', which has a circular aperture 22a with a radius smaller than the effective diameter of the pupil conjugate image PI, may be inserted into the optical path. Also, as shown in FIG. 4(c), a light shielding plate 22" having a slit aperture 22b may be inserted into the optical path. Further, the aperture shape of the light shielding plate 22 is not limited to the above-described aperture shapes, and a case is also included where oblique illumination is performed in such a manner that the light shielding plate 22, which is provided with an aperture having a shape other than the above-described aperture shapes and having an area smaller than the area of the pupil conjugate image PI, is moved in the plane substantially perpendicular to the optical axis. Note that the principle that a phase object can be observed under oblique illumination is already described in many literatures, and the like, and hence the detailed description thereof is omitted here.

The light shielding plate 22 is described in more detail with reference to FIG. 5. FIG. 5 is a graph in the case where the insertion direction (axis A) of the rectangular light shielding plate 22 shown in FIG. 4(a) is taken as the abscissa, and where the light shielding rate of the light shielding plate 22 is taken as the ordinate. FIG. 5(a) shows the case where the light shielding rate is set to about 100% over the entire surface, FIG. 5(b) shows the case where the light shielding rate on the insertion direction leading edge side is set to 50% and where the light shielding rate on the opposite side is set to 100%, and FIG. 5(c) shows the case where the light shielding rate is continuously increased from the insertion direction leading edge side to the opposite side. When a sample with a large phase difference is observed, the light shielding plate 22 configured to have the transmittance distribution as shown in FIG. 5(b) and FIG. 5(c) can suppress glare due to excessive contrast to a greater extent than the light shielding plate 22 configured as shown in FIG. 5(a), and hence is useful for the observation. Further, also in the light shielding plate 22' provided with the circular aperture 22a as shown in FIG. 4(b) and the light shielding plate 22" provided with the slit aperture 22b as shown in FIG. 4(c), the light shielding plate, having the configuration in which, at the boundary portion between the aperture section and the light shielding section, the light shielding rate is continuously increased to eventually become 100%, is more useful for the observation of a sample with a large phase difference than the light shielding plate having the configuration in which the difference in the light shielding rate is 100% at the boundary portion between the aperture section and the light shielding section.

Figure 6:
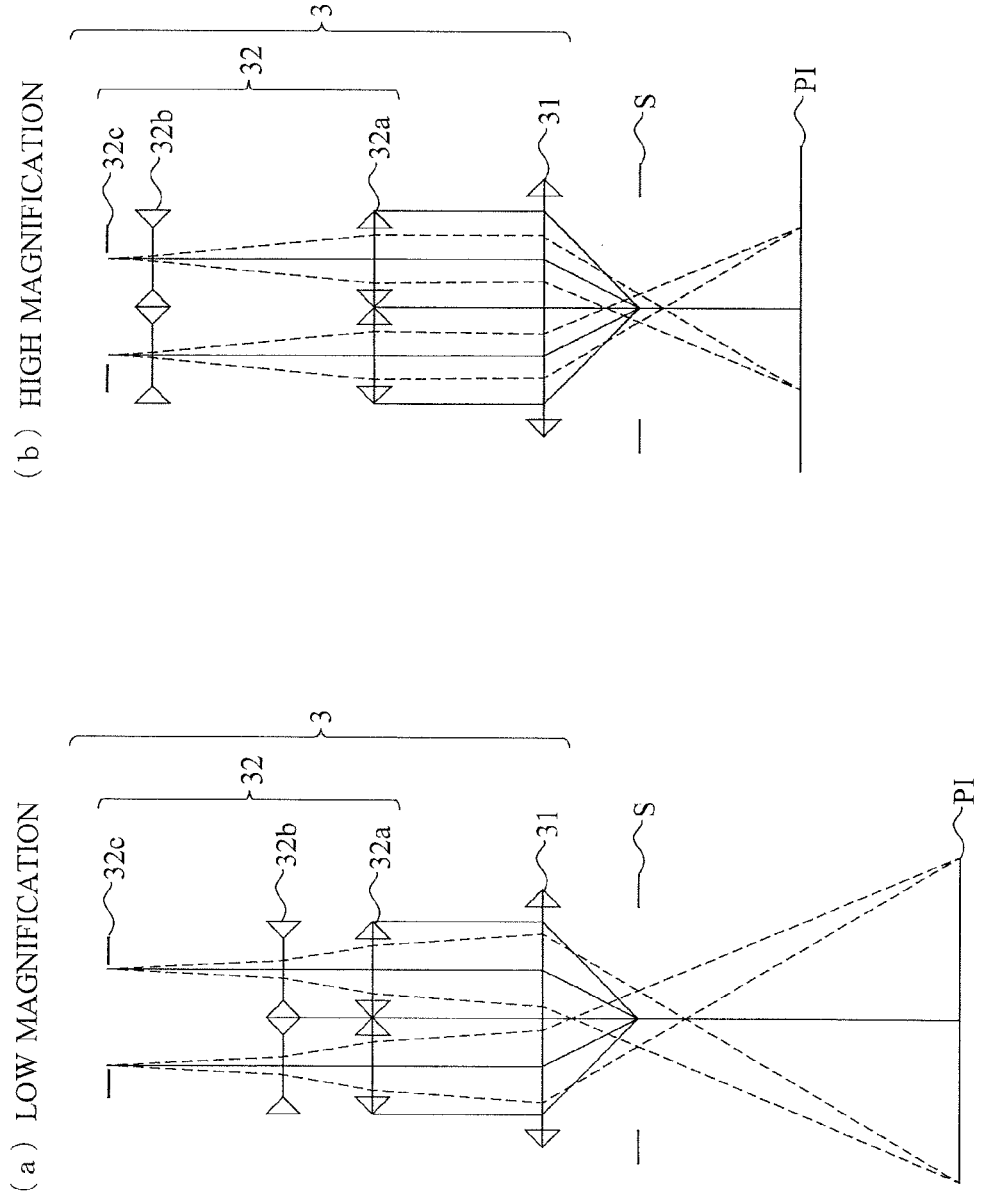

The imaging optical system 3 in the microscope apparatus 1 includes a plurality of kinds of objective lenses, and a variable power mechanism. Thus, as shown in FIG. 6(a) and FIG. 6(b), the position of the conjugate image PI of the entrance pupil of the imaging optical system 3, which conjugate image PI is formed on the illumination side with the sample surface S as a boundary, is greatly changed according to the magnification of the variable power lens group 32. Here, the variable power lens group 32 is configured by including a fixed group 32a, a movable group 32b, and an aperture stop 32c. Particularly, when a low-power objective lens is mounted as the objective lens 31, and when the variable power lens group 32 is in the lowest magnification, the conjugate image PI of the entrance pupil of the imaging optical system 3 is formed at a place separated most from the sample surface S, or the real image is replaced by the virtual image so that the conjugate image PI of the entrance pupil is not formed on the illumination side.

Thus, in the microscope apparatus 1 according to the present embodiment, the illumination apparatus 2 incorporated in the base unit 101 of the microscope apparatus 1 is configured, as shown in FIG. 3, such that the light diffusing element 23, which diffuses the luminous flux transmitted without being shielded by the light shielding plate 22, is arranged between the sample surface S and the light shielding plate 22. Note that, in FIG. 3, reference character D denotes an optical-axis direction interval between the light shielding plate 22 and the light diffusing element 23.

Figure 7:
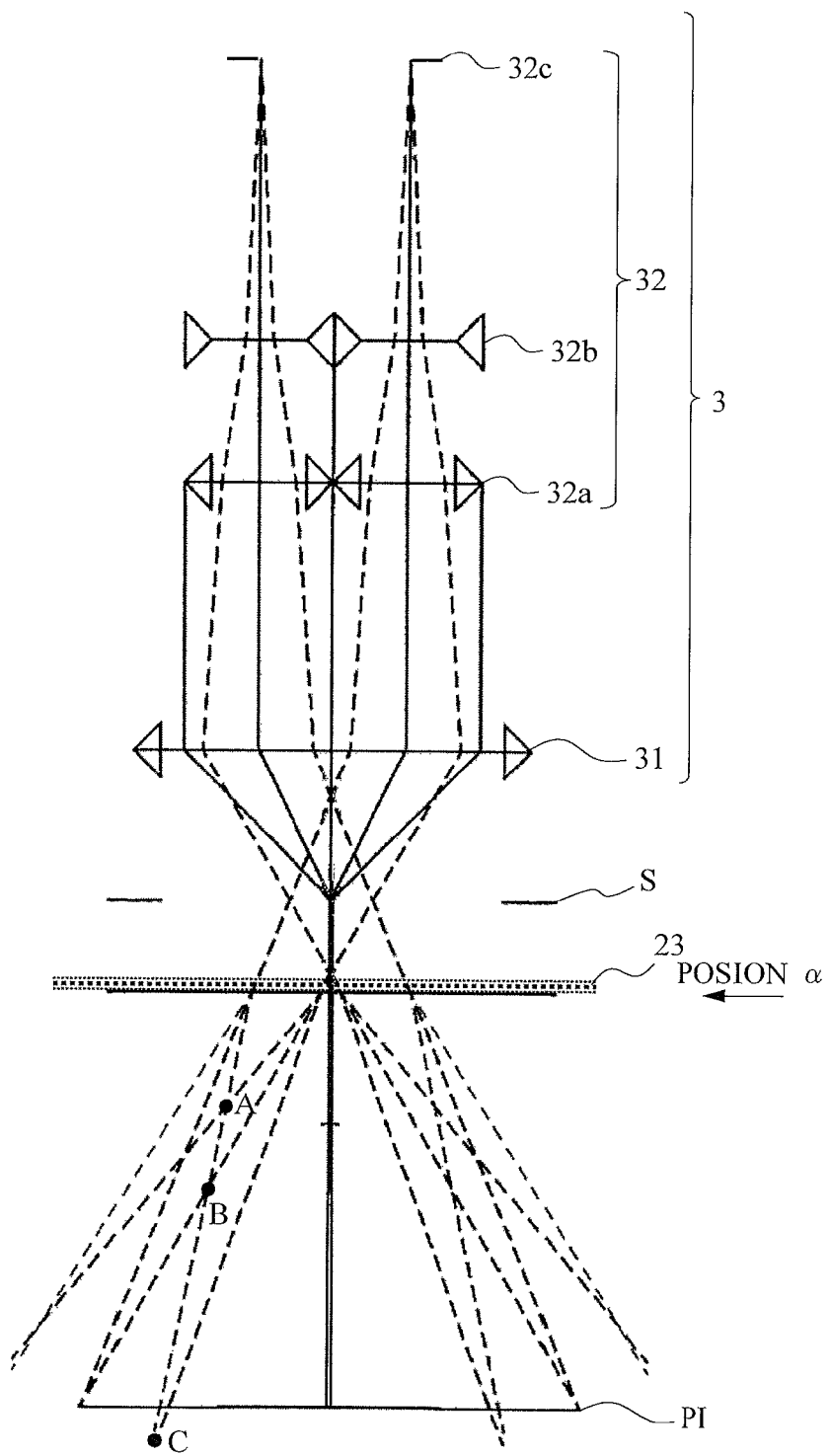
FIG. 7 is an illustration for explaining the position of the conjugate image of the entrance pupil of the imaging optical system, and is an illustration in the case where the light diffusing element is arranged near the sample surface.
Figure 8:
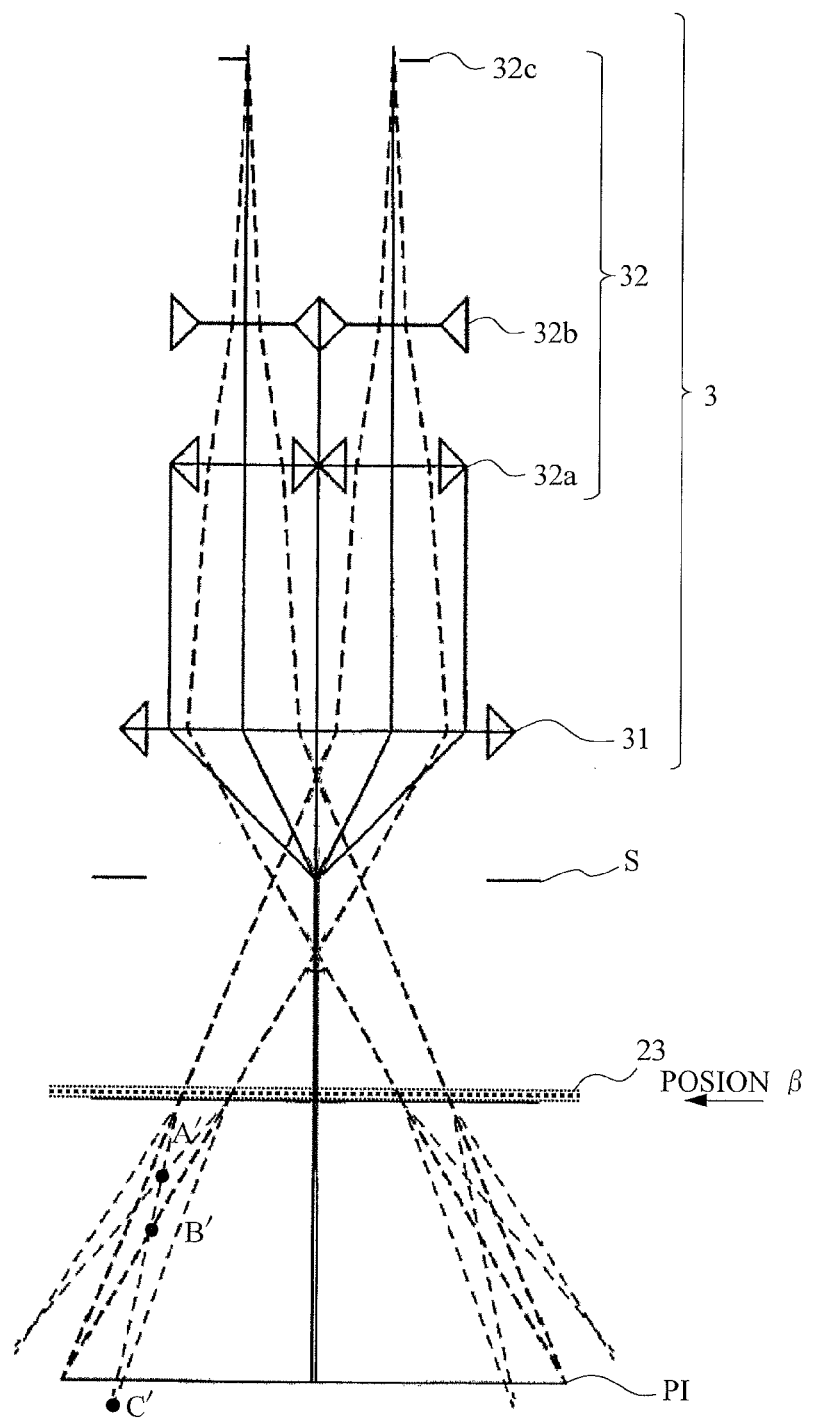
FIG. 8 is an illustration for explaining the position of the conjugate image of the entrance pupil of the imaging optical system, and is an illustration in the case where the light diffusing element is arranged away from the sample surface.

In the microscope apparatus 1 having the illumination apparatus 2 configured in this way, when the light diffusing element 23 is arranged at a position α between the conjugate image PI of the entrance pupil and the sample surface S (a position near the sample surface S) as shown in FIG. 7, light is diffused so that, as shown in FIG. 7, the conjugate image of the entrance pupil is not only formed on the one plane (the plane of the conjugate image PI of the entrance pupil which plane is formed when the light diffusing element 23 is not arranged) having the optical axis as a normal, but also formed, by the diffused light, on each of a plurality of planes represented by points A, B and C. On the other hand, as shown in FIG. 8, when the light diffusing element 23 is arranged at a position β (in a state of being close to the conjugate image PI of the entrance pupil) which is separated from the sample surface S by a greater distance than in the case shown in FIG. 7, the conjugate image of the entrance pupil is not only formed on the plane of the conjugate image PI of the entrance pupil, which plane is formed when the light diffusing element 23 is not arranged, but the conjugate image of the entrance pupil is also formed, by the diffused light, on each of a plurality of planes represented by points A', B' and C'. Note that in FIG. 7 and FIG. 8, among rays emitted from the pupil (aperture stop 32c) of the imaging optical system 3 toward the sample surface S, the rays corresponding to the maximum aperture are indicated by broken lines. Further, in the region extending from the light diffusing element 23 in FIG. 7 and FIG. 8, in addition to the rays corresponding to the maximum aperture, rays toward two directions are shown among the rays diffused from each of the rays corresponding to the maximum aperture.

As can be seen from FIG. 7 and FIG. 8, when the light diffusing element 23 is arranged between the sample surface S and the conjugate image PI of the entrance pupil, and when the light guide plate 21 and the light shielding plate 22 are arranged at least between the points A to C (points A' to C'), the entrance pupil of the imaging optical system 3 can be filled with the illumination light. That is, by providing the light diffusing element 23, it is possible to obtain an effect as if the depth of focus of the conjugate image of the entrance pupil is increased. For this reason, when the light guide plate 21 and the light shielding plate 22 shown in FIG. 3 are arranged in the range of the points A to C (points A' to C') in consideration of the magnification of the objective lens 31 and of the variable power lens group 32, the entrance pupil can be filled with the illumination light regardless of the magnification of the imaging optical system 3. Further, the light shielding plate 22, which is moved in one plane having the optical axis of the objective lens 31 as a normal, similarly has the problem that the variable power range, in which the oblique illumination can be performed, is restricted because the light shielding plate 22 cannot suitably restrict the conjugate image PI of the entrance pupil of the imaging optical system 3, which conjugate image PI is moved according to the change in the magnification. However, in the case where the light diffusing element 23 is provided as described above, even when the magnification of the objective lens 31 and of the variable power lens group 32 is changed, the light guide plate 21 and the light shielding plate 22 can be arranged in the range of the diffused conjugate images of the entrance pupil (the images formed in the points A to C, or the points A' to C'), and hence oblique illumination can be suitably performed. At this time, as shown in FIG. 7 and FIG. 8, when the light diffusing element 23 is arranged so as to be close to the sample surface S, the arrangement area of the light guide plate 21 and the light shielding plate 22 is expanded. Thus, such arrangement of the light diffusing element 23 is preferred.

Further, as described above, when the light shielding plate having the transmittance of approximately 0% is used in the conventional microscope apparatus, there is a case where the contrast at the boundary portion of a phase object as a sample becomes too high and thereby the detailed structure around the boundary portion cannot be observed. However, when the light is transmitted through the light diffusing element 23, the directivity of oblique illumination is weakened, so that, even when the light shielding plate having the transmittance of 0% is used, it is possible to suppress glare due to the excessive contrast of the observation image.

Here, it preferred that the distance D [mm] between the light diffusing element 23 and the light shielding plate 22 satisfies the following expression (1).

$$D \leq 34 \tag{1}$$

The thickness from the bottom portion of an ordinary illumination frame (for example, the base unit 101 shown in FIG. 1) to the sample surface is about 80 mm to 150 mm. On the other hand, the thickness of an illumination frame referred to as a thin type is 50 mm or less. In order to realize an illumination frame having a thickness of 50 mm or less, it should be configured such that the conjugate image PI of the entrance pupil of the imaging optical system 3 is formed at a position separated by about 40 mm downward from the sample surface, and such that the light shielding plate 22 and the light source (light guide plate 21) are arranged in the vicinity of the position. Further, in the stereoscopic microscope apparatus, the aperture of a 1× objective lens, which is most normally used, is in the range of 0.015 to 0.025 at the minimum magnification of the variable power lens. Since the optical system is considered to be almost free from aberration, the point image intensity distribution on the optical axis can be analytically calculated, and the intensity becomes 0 at a position separated by 2 mm to 6 mm from the position where the intensity becomes a maximum. Therefore, in order to prevent the formation of the sample image from being affected by the surface structure of the light diffusing element 23, it is more preferred that the light diffusing element 23 is arranged to be separated by 6 mm or more from the sample surface. However, because of the above-described reason, it is preferred that the interval D between the light diffusing element 23 and the light shielding plate 22 is 34 mm or less.

Meanwhile, it is known that, when the parallel transmittance and the haze value, as the optical properties of the diffusion surface of the light diffusing element 23, are respectively set as T [%] and H [%], the parallel transmittance and the haze value respectively satisfy the conditions expressed by the following expressions (2) and (3).

$$50 < T < 95 \tag{2}$$

$$10 < H < 98 \tag{3}$$

When the parallel transmittance T of the diffusion surface of the light diffusing element 23 is less than the lower limit of the conditional expression (2), the secular deterioration of the light source by heat becomes a problem. On the contrary, when the parallel transmittance T of the diffusion surface of the light diffusing element 23 exceeds the upper limit of the conditional expression (2), the directivity of oblique illumination is enhanced, so that it is not possible to suppress glare due to the excessive contrast of the observation image. Further, when the haze value H of the diffusion surface of the light diffusing element 23 is less than the lower limit of the conditional expression (3), the above-described diffusion effect is lost. On the contrary, when the haze value H of the diffusion surface of the light diffusing element 23 exceeds the upper limit of the conditional expression (3), the contrast cannot be given to the observation image of the phase object. Note that it is more preferred that the light diffusing element 23 satisfies the following expressions (4) and (5).

$$75<T<90 \quad (4)$$

$$20<H<50 \quad (5)$$

Note that, when a condenser lens 24 is added to the illumination apparatus 2 as shown in FIG. 9(a) and FIG. 9(b), then in a wide variable power range from a low-power region to a high-power region of the low-power objective lens 31 and of the variable power lens group 32, the conjugate image PI of the entrance pupil of the imaging optical system 3 can be formed at an almost fixed position which is located on the illumination side with the sample surface as a boundary and which is close to the sample surface. Thus, when the light guide plate 21 and the light shielding plate 22 are arranged at the position of the conjugate image PI of the entrance pupil or at a position close to the position of the conjugate image PI of the entrance pupil, it is possible to realize a thin transmitted illumination optical system. In the case of such configuration, the light diffusing element 23 is arranged between the sample surface S and the condenser lens. Further, in order to further reduce the thickness of the illumination optical system, it is effective to reduce the focal distance of the condenser lens 24. However, the condenser lens 24 is configured by a possible smallest number of lenses for the thickness reduction. Thus, when the focal distance is reduced, it becomes difficult to perform aberration correction. For this reason, in such case, the aberration correction effect can be given to the condenser lens 24 by forming the surface shape of at least one surface of the condenser lens 24 into an aspheric shape.

Figure 10:
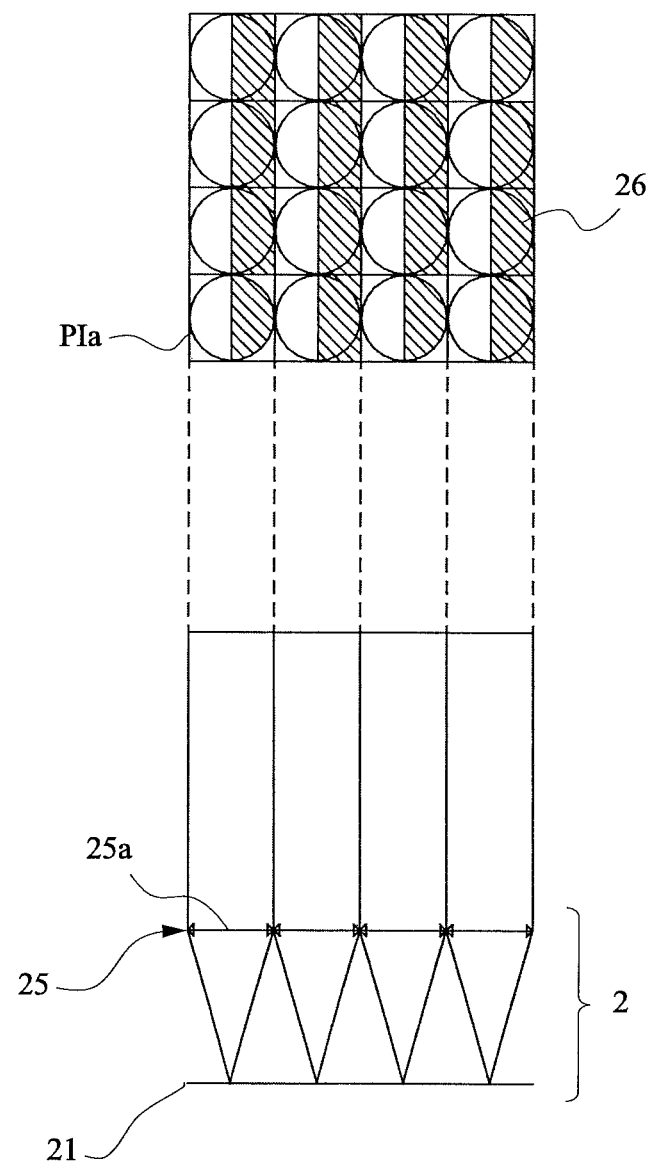
FIG. 10 is an illustration in the case where a lens array is used in the illumination apparatus instead of the condenser lens.

Further, when a lens array 25, which is formed by arranging a plurality of micro lenses 25a in an array form as shown in FIG. 10, is used instead of the condenser lens 24, the focal distance of the one micro lens 25a can be reduced, and hence the thickness of the illumination apparatus 2 can be reduced. However, when oblique illumination is performed, it is necessary, as shown in FIG. 10, to shield the illumination light by using a light shielding plate 26 that is configured to shield each of the conjugate images PIa of the entrance pupil, which are formed by the number corresponding to the number of the micro lenses 25a. Note that, even in the case of such configuration, it is possible to adjust the visual field by inserting an adjustable diaphragm between the sample surface S and the light shielding plate 22. Also, in this case, the light diffusing element 23 is arranged between the sample surface S and the lens array.

Further, instead of the condenser lens and the light diffusing element, a condenser lens, at least one surface of which is a diffusion surface, may also be arranged. As a result, the number of elements is reduced by one, so that the thickness of the illumination apparatus 2 can be further reduced. Further, when a weak phase object is observed, there is also a case where the observation is to be performed with high contrast. For this reason, it is also effective to enable the light diffusing element 23 to be inserted and extracted into and from the optical path of the illumination apparatus 2.

Note that, in the configuration described above, even when the light source of the light guide plate 21 is exchanged by the other light source, such as, for example, a cold cathode tube, or the like, such configuration is also included in the scope of the present invention utilizing the small thickness of the surface light emitter. Further, a configuration, in which a thin surface light source, such as organic EL, inorganic EL, and the like, is used instead of the light guide plate 21, is also similarly included in the scope of the present invention.

Further, when bright field observation is performed in the microscope apparatus 1, it is only necessary to completely remove the light shielding plate 22 from the optical path. In this case, the bright field observation is not hindered, even when, in order to further reduce the thickness of the illumination apparatus 2, the illumination apparatus 2 is configured such that, as shown in FIG. 3, the condenser lens is removed to allow the light guide plate 21 to be located directly under the sample surface S. In this case, it is possible to adjust the visual field by inserting an adjustable diaphragm between the sample surface S and the light guide plate 21. However, when the light guide plate 21 is arranged within the depth of focus of the objective lens 31, there is a possibility that the structure in the light guide plate 21 is seen and thereby the observation is hindered. Thus, when a low-power objective lens having a deep depth of focus is used as the objective lens 31, it is preferred that the objective lens 31 is arranged at a position away from the sample surface S.

REFERENCE SIGNS LIST

1 Microscope apparatus
2 Illumination apparatus
21 Light guide plate (surface light emitter)
21a Light emitting surface
22, 26 Light shielding plate (light shielding element)
23 Light diffusing element
24 Condenser lens
25 Lens array
25a Micro lens
3 Imaging optical system
31 Objective lens
32 Variable power lens group
S Sample
PI, PIa Conjugate image of entrance pupil of imaging optical system

The invention claimed is:

1. A microscope apparatus comprising:
an illumination apparatus which includes:
   a surface light emitter,
   a light diffusing element, and
   a light shielding plate, wherein
      the surface light emitter has a light emitting surface as a planar light emitting region and is configured to irradiate a sample with light emitted from the light emitting surface,
      the light shielding plate is parallel to the light emitting surface and is arranged at a position between the surface light emitter and the light diffusing element, the position being closer to the surface light emitter than to the light diffusing element; and
an imaging optical system which includes an objective lens configured to condense light from the sample, and a variable power lens group configured to form an image of the sample by changing a magnification of the image along a magnification range having a first end and a second end, wherein
   the imaging optical system provides a region where diffused conjugate images of an entrance pupil of the imaging optical system are formed via the light diffusing element, moves the region according to the change in the magnification from one of the first and second ends of the magnification range to the other of the first and second ends, and provides a common region that is common to the region as the region is moved from said one of the first and second ends of the magnification range to said other of the first and second ends, and the surface light emitter and the light shielding plate are arranged within a range of the common region.

2. The microscope apparatus according to claim 1, wherein, when an interval between the light shielding plate and the light diffusing element is set as D [mm], a condition given by the following expression is satisfied: D≤34.

3. The microscope apparatus according to claim 1, wherein, when a parallel light transmittance and a haze value which are optical properties of a diffusion surface formed in the light diffusing element are respectively set as T [%] and H [%], conditions given by the following expressions are satisfied: 50<T<95 and 10<H<98.

4. The microscope apparatus according to claim 1, wherein the illumination apparatus includes a condenser lens which condenses the light emitted from the surface light emitter and irradiates the sample with the condensed light.

5. The microscope apparatus according to claim 4, wherein the condenser lens includes at least one surface formed in an aspheric shape.

6. The microscope apparatus according to claim 4, wherein the condenser lens is configured by a lens array in which a plurality of lenses are arranged in an array form.

7. The microscope apparatus according to claim 1, wherein the surface light emitter is configured by including a light source, and a light guide plate which provides the light emitting surface and allows light emitted from the light source to be emitted from the light emitting surface.

8. The microscope apparatus according to claim 7, wherein the light source is configured by a plurality of white LEDs.

9. The microscope apparatus according to claim 7, wherein the light source is configured by a plurality of LEDs each having a different peak wavelength.

10. The microscope apparatus according to claim 4, wherein at least one of the surface light emitter and the condenser lens is configured to be movable along an optical axis.

11. The microscope apparatus according to claim 1, wherein the illumination apparatus is configured to be able to perform oblique illumination.

* * * * *